United States Patent [19]

Baseman

[11] Patent Number: 4,812,503

[45] Date of Patent: Mar. 14, 1989

[54] PAINT COMPOSITION CONTAINING A VOLATILE CORROSION INHIBITOR

[75] Inventor: Maurice S. Baseman, Pittsburgh, Pa.

[73] Assignee: Ronco Laboratories, Inc., Pittsburgh, Pa.

[21] Appl. No.: 131,657

[22] Filed: Dec. 11, 1987

[51] Int. Cl.$^4$ ................................................ C08K 5/20
[52] U.S. Cl. .................................... 524/226; 523/455; 523/461; 524/230
[58] Field of Search ............................... 524/226, 228

[56] References Cited

U.S. PATENT DOCUMENTS

| | | |
|---|---|---|
| 2,330,524 | 9/1943 | Shields . |
| 2,653,854 | 9/1953 | Sohaar . |
| 2,784,104 | 3/1957 | Baseman et al. . |
| 2,829,945 | 4/1958 | Kriey . |
| 3,169,116 | 2/1965 | Baseman et al. . |
| 4,687,634 | 8/1987 | Baseman et al. . |

FOREIGN PATENT DOCUMENTS 1114670  5/1968  United Kingdom ................ 524/226

*Primary Examiner*—Lewis T. Jacobs
*Assistant Examiner*—David W. Woodward
*Attorney, Agent, or Firm*—Joseph J. Carducci

[57] ABSTRACT

A novel paint composition comprising an organic solvent-based, organic solid film-forming component and an organic volatile corrosion inhibitor.

5 Claims, No Drawings

PAINT COMPOSITION CONTAINING A VOLATILE CORROSION INHIBITOR

BACKGROUND OF THE INVENTION

1. Field of the Invention

This invention relates to a novel paint composition comprising an organic solid film-forming component, particularly an organic solvent-based, organic solid film-forming component and an organic volatile corrosion inhibitor.

2. Description of the Prior Art

The prevention of corrosion of metal surfaces, and the attendant weight loss therefrom, resulting in the loss of utility of bodies composed of such metal surfaces, has always been a serious problem, particularly when such metal surfaces have been exposed to water, rain or snow, subjected to conditions of high humidity and confronted with an atmosphere high in acidic materials. Such corrosion problems are of primary importance not only in the ferrous metal field but also of considerable importance for many of the non-ferrous metals.

Much work has been done in an attempt to alleviate these problems. In some cases the metal surface has been coated with materials that attempt to shield the metal surface from its hostile environment, but this procedure has not always been effective, for the coating material will often fall to remain on the metal, in whole or in part, leaving the exposed metal surface in jeopardy again. In other cases, the metal surfaces have been coated with materials, such as oils or waxes, incorporating therein a corrosion inhibitor to inhibit corrosion of such metal surfaces. These materials tend to be easily removed from the metal surface; thus their usefulness is minimal at best. Paints, with or without a solid corrosion inhibitor, such as zinc chromate, have also been used to coat material surfaces to inhibit corrosion thereof, but with mixed success, for here, too, if the paint fails to adhere to the metal surface, whether or not the solid corrosion inhibitor is incorporated therein, the metal surface will then again be subject to its hostile environment. Moreover, when such paints contain a solid corrosion inhibitor, the latter is dispersed throughout the body of the paint film and the only portion of the total corrosion inhibitor that is effective is that small amount on the inner surface of the paint film that interfaces with the adjacent metal surface.

SUMMARY OF THE INVENTION

I have found that the novel paint composition defined and claimed herein, namely, one containing an organic solid film-forming component, particularly an organic solvent-based, organic solid film-forming component and a volatile corrosion inhibitor will effectively inhibit corrosion of a metal surface carrying such novel paint composition.

The fact that such paint composition is effective in inhibiting corrosion of a metal surface is quite unexpected. One skilled in the art would have expected that a paint composition carrying a volatile corrosion inhibitor would have no more corrosion-inhibiting properties than the same paint composition without the corrosion inhibitor, because once the paint is applied to the metal surface, the volatile corrosion inhibitor would tend to volatilize into the atmosphere, leaving the resulting paint film or coating depleted of corrosion inhibitor. While some corrosion inhibitors may volatilize into the atmosphere, I have surprisingly discovered that sufficient corrosion inhibitor will nevertheless migrate through the paint film to form an additional, apparently continuous, coating comprised of such corrosion inhibitor on the metal surface to protect the same. Moreover, the evidence appears to suggest that even if the paint film is disrupted, exposing a part of the metal surface, some corrosion inhibitors will migrate from the portion of the film adjacent to disruption to coat the bare metal and inhibit corrosion thereof. Additionally, when the paint composition defined and claimed herein is employed to coat a metal surface, two films are believed to be formed, an outer organic film and a film composed of such corrosion inhibitor intemerdiate the inner face of the organic film and the adjacent metal surface.

As previously defined the novel paint composition claimed herein contains as its required components an organic solid film-forming component, particularly an organic solvent-based organic solid film-forming component and an organic volatile corrosion inhibitor. Any resinous organic polymer, soluble or dispersable in an organic solvent or water, and capable of converting into a solid film when applied onto a metal surface through the reaction with air or water, or via a catalytic means, or capable of forming a film through evaporation of a volatile solvent, can be used. A preferred resinous organic polymer suitable for use in preparing the novel composition herein includes the popular alkyd esters commonly used in alkyd-based paints, for example alkyds combined with phenoplast, nitrocellulose, chlorinated rubber, polystyrene, diisocyanate, vinyl and epoxies, aminoplast, aminoplast and epoxy or silicone. A particularly preferred alkyd resin useful herein is an alkyd oil-based resin composed of soya bean acid reacted with a glycol. Other film-forming resinous materials include vinylacetals and/or phenolic, alkylaminoplast, alkyd, epoxy, 2,4,6-trimethylolphenyl ether, phenoplasts, with or without epoxy, vinylacetal or aminoplast, polyester and triazine resin, allyl polyester, silicone, thermosetting acrylics, complex amino resins, vinyl acetate-chloride copolymers, vinylidene or vinyl chloride-acrylonitrile copolymers, butadiene copolymers, acrylic copolymers, polyvinyl acetate, polyurethanes, polytetrafluoroethylene, polyvinyl acetals, saturated polyesters, unsaturated polyesters and styrene, epoxy and polyamide and copolymers of ethylene or propylene.

A solvent that is capable of solubilizing the organic solid film-forming component can be any volatile organic liquid, such as naphtha or mineral spirits, normally used in commercial paint compositions, that can serve as a thinner for the composition to reduce its viscosity to facilitate its application to a metal surface. Water can also be used as a thinner herein.

Any organic volatile corrosion inhibitor can be used in combination with the organic solid film-forming material. Included, for example, are amine salts with nitrous or chromic acids or with carbonic, carbamic, acetic and substituted or unsubstituted benzoic acids; organic esters of nitrous, phthalic or carbonic acids; aliphatic, cycloaliphatic and aromatic amines; polymethyleneamines; mixtures of nitrites with urea; nitrobenzenes; and dicyclohexylamine nitrate. Especially useful volatile corrosion inhibitors for use in preparing the novel paint compositions claimed herein are the reaction products obtained as a result of the reaction of substantially equimolar proportions of a cycloaliphatic amine, particularly a dicyclohexylamine, and an organic acid having from six to 16 carbon atoms, preferably from seven to ten carbon atoms. These reaction products can be obtained for example, by mixing the cycloaliphatic amine and the organic acid at room temperature (25° C.) for ten to 15 minutes. Especially desired reaction products of dicyclohexylamine with a $C_7$ or $C_8$ organic acid useful herein are further defined in U.S. Pat. Nos. 2,784,104, 3,169,116 and 4,687,634 to Baseman et al. By "organic volatile corrosion inhibitor" I mean to include such compounds whose vapor pressure at ambient temperature (25° C.) and ambient pressure (760 mm Hg) is great enough to volatilize and form vapors thereof capable of depositing on a metal surface and forming a corrosion inhibiting film thereon.

Also includable herein as a component of the novel claimed paint compositions are pigments normally added to paints to give body thereto, provide a decorative effect and to help protect the surface of the metal and the organic film by filtering out the ultra violet rays, and colorants, such as carbon black, that serve to give color to the paint. Included among pigments suitable for use herein are finely-divided metal oxides, such as titanium dioxide, zinc oxide, ferric oxide and calcium carbonate.

It is also within the purview of the invention claimed herein to add the organic volatile corrosion inhibitors defined herein to a paint composition already having incorporated therein inorganic corrosion inhibitors, including chromates, such as zinc chromate; nitrates such as ferric nitrate; phosphates, such as polyphosphates and oxide; molybdates, such as zinc molybdates; borates, such as zinc borates, etc. In such case, the presence of the organic corrosion inhibitors enchances the corrosion inhibiting abilities of the paint composition in that an additional film-forming, corrosion-inhibiting entity is present on the metal surface should the organic coating film be broken.

In addition to the above, the novel paint composition claimed herein can have incorporated therein additional compounds normally used to modify or obtain a desired property, for example, fungicides, dryers, mildewcides, ultra violet absorbers, anti-skimming agents, etc.

The preparation of the claimed novel paint composition is not critical and merely requires that the components be added to each other, in any suitable or convenient manner, preferably at ambient temperature and ambient pressure, and mixing thoroughly until a substantially homogenous composition is obtained, for example, from about 10 minutes to about one hour, or more.

Generally the amounts of the components present in the claimed paint composition are set forth below in Table I.

TABLE I

| | Weight Percent | |
|---|---|---|
| | Broad Range | Preferred Range |
| Film-forming Component | 20 to 60 | 30 to 50 |
| Thinner | 20 to 60 | 30 to 50 |
| Volatile Corrosion Inhibitor | 0.5 to 10 | 1 to 5 |
| Pigment | 5 to 40 | 10 to 30 |
| Optional Additives | 0 to 2 | 0.1 to 1.5 |

DESCRIPTION OF PREFERRED EMBODIMENTS

The following will further illustrate the uniqueness of the claimed paint composition herein.

In each of the following examples, wherein an organic volatile corrosion inhibitor was used, there was first prepared a 10 weight percent solution of the organic volatile corrosion inhibitor dissolved in a paint thinner (mineral spirits).

Low carbon, cold rolled steel No. 1020 coupons, having a dimension of 1¾ inches × 2½ inches × b 1/16 inch, and conforming to MIL-S-7952, used in the examples, were washed with detergents and water, dried with a paper towel and both sides were polished with 320 grit paper. The cleaned coupons were then dipped into the various paint samples, defined below, with forceps, to ensure complete coverage of the paint, after which they were suspended with stainless steel hooks through a hole at the top of the coupons and allowed to dry for 48 hours. One side of the coupons was then marked, using a scriber, to form a 2-inch "X", making sure that bare metal was exposed within the confines of the "X".

Each of the prepared coupons was suspended from the inner face of the lid of a straight-side glass quart jar, approximately one inch from said inner face, with a stainless steel hook. 50 milliliters of an appropriate liquid was placed in the bottom of the glass jar, either containing distilled water or having dissolved therein one weight percent hydrochloric acid or synthetic sea water described below in Table II.

TABLE II

| Components | Grams/Liter of Solution |
|---|---|
| Magnesium chloride hexahydrate | 11.0 |
| Anhydrous calcium chloride | 1.2 |
| Anhydrous sodium sulfate | 1.0 |
| Sodium chloride | 25.0 |

The lid was screwed onto the jar, the juncture of the lid and the jar was sealed with electrical tape and the jar was then placed in a forced air oven and heated to 130° F. and held at such temperature for eight hours. At the end of eight hours, the jar was placed in a refrigerator and remained therein for 16 hours. This cycling procedure continued for eleven days. At the end of the test period the coupons were removed and visually examined.

In each example below duplicate runs were carried out over each of the water, acid water solution and the synthetic sea water and substantially identical results were obtained.

Two organic volatile corrosion inhibitors were employed: the reaction product obtained as a result of the reaction of equal molar amounts of dicyclohexylamine with heptanoic acid (DCH) or with normal octanoic acid (DCO), as described in U.S. Pat. No. 4,687,634 to Baseman et al.

EXAMPLE I

A low carbon, cold rolled No. 1020 steel coupon, prepared as described above, was coated with a paint containing 35 weight percent of an alkyd oil-based resin composed of soya bean acid reacted with a glycol and 65 weight percent of an organic paint thinner (mineral spirits), a second low carbon, cold rolled No. 1020 steel coupon was coated with the same paint but containing one weight percent DCH, defined above, and a third low carbon, cold rolled No. 1020 steel coupon was coated with the same paint but containing one weight percent DCO, defined above. After exposure to the described test procedures, the coupon coated with the base paint was heavily blistered, indicating rusting beneath the blisters, and the bare metal within the confines of the "X" was heavily rusted. In each of the coupons coated with the paint carrying DCH and DCO, no blistering was noted and the bare metal within the confines of the "X" was bright and clean.

EXAMPLE II

The runs of Example I were repeated except that the paint used was a polyurethane-based paint, Benwood Polyurethane Finest Paint sold by Benjamin Moore & Co. The results obtained were identical to those obtained in Example I.

Example III

The runs of Example I were further repeated, except that the paint used was a latex paint, Mooreglo Latex House and Trim Paint, White, No. 09601, sold by Benjamin Moore & Co. The results obtained were identical to those obtained in Example I.

EXAMPLE IV

This example shows that the addition of an organic volatile corrosion inhibitor to a commercial paint useful in coating metal surfaces further enhances its corrosion-inhibiting properties. The paint used was Rust Oleum Smoky Gray No. 7786, sold by the Rust Oleum Company. The runs were again carried out as in Example I except that five coupons coated with the paint carrying, respectively, 0.1, 0.3, 0.5, 1.0 and 2.0 weight percent DCH and five coupons coated with the same paint carrying, respectively, 0.1, 0.3, 0.5, 1.0 and 2.0 weight percent DCO were tested. Each of the coupons carrying the base paint coating and the paint containing 0.1 and 0.3 weight percent of DCH and DCO were heavily blistered and the bare metal within the confines of the "X" was heavily rusted. Each of the coupons carrying paint containing 0.5 weight percent of the volatile corrosion inhibitors exhibited a slight improvement in corrosion resistance over the ones carrying 0.1 and 0.3 weight percent of the corrosion inhibitors. However, when the paint used contained 1.0 and 2.0 weight percent of DCH or DCO, no blistering was noted and the bare metal within the confines of the "X" was bright and clean.

The results obtained above are unique and totally unexpected. Since the corrosion inhibitor used is volatile, it would have been expected that during the tests it would have volatilized and would have been incapable of forming a film on the metal surface and therefore would have been useless as a corrosion inhibitor. And yet the corrosion inhibitor, or at least a sufficient amount thereof, must have migrated to the metal surface, for no blistering occurred when it was used in sufficient amounts. It was even mre unusual that the bare metal within the confines of the "X" was also protected against corrosion, for the bare metal within the confines of the "X" was totally exposed during the runs. The corrosion inhibitor that must have formed a film on the metal surface prior to the formation of the "X" must have remained adhered to the metal surface throughout the test and/or sufficient corrosion inhibitor in the paint must have migrated to the "X" after the formation thereof to protect the bare metal therein from corrosion.

Obviously, many modifications and variations of the invention, as hereinabove set forth, can be made without departing from the spirit and scope thereof and, therefore, only such limitations should be imposed as are indicated in the appended claims

I claim:

1. A novel paint composition comprising (1) an organic solid film-forming component selected from the group consisting of an alkyd ester and a polyurethane resin, (2) an organic volatile corrosion inhibitor obtained from the reactants consisting of dicyclohexylamine and an organic acid having from seven to eight carbon atoms, (3) an organic solvent and (4) a pigment.

2. The composition of claim 1 wherein said organic solid film-forming component is an alkyd ester.

3. The composition of claim 1 wherein said organic solid film-forming component is a polyurethane resin.

4. The composition of claim 1 wherein said organic acid has seven carbon atoms.

5. The composition of claim 1 wherein said organic acid has eight carbon atoms.

* * * * *